United States Patent [19]

Bowsher

[11] Patent Number: 4,636,052
[45] Date of Patent: Jan. 13, 1987

[54] AUTOMATIC HAND-HELD PHOTOGRAPHIC LIGHT METERS

[75] Inventor: John M. Bowsher, Cobham, United Kingdom

[73] Assignee: Minolta Camera Kabushiki Kaisha, Osaka, Japan

[21] Appl. No.: 840,608

[22] Filed: Mar. 17, 1986

Related U.S. Application Data

[63] Continuation of Ser. No. 639,664, Aug. 8, 1984, abandoned.

[30] Foreign Application Priority Data

Aug. 10, 1983 [GB] United Kingdom ............... 8321464

[51] Int. Cl.$^4$ .................. G03B 7/00; G08C 19/36; G01J 1/42
[52] U.S. Cl. ................... 354/410; 354/420; 340/870.02; 340/870.16; 340/870.28; 356/218
[58] Field of Search ............ 354/62, 67, 131, 295, 354/410, 413, 420, 429, 432, 475; 356/218; 352/140; 340/600, 870.16, 870.28, 870.29, 870.21, 870.02

[56] References Cited

U.S. PATENT DOCUMENTS

| | | | |
|---|---|---|---|
| 4,036,762 | 7/1977 | Troetscher et al. | 354/410 X |
| 4,239,356 | 12/1980 | Freudenschuss et al. | 354/413 |
| 4,284,338 | 8/1981 | Ikuno | 354/413 |
| 4,304,472 | 12/1981 | Shinoda et al. | 354/475 X |
| 4,310,228 | 1/1982 | Terada | 354/413 |

OTHER PUBLICATIONS

Electronic Integrated Circuits and Systems, Franklin C. Fitchen, Electrical Engineering Department, South Dakota State Univ.

Primary Examiner—William B. Perkey
Attorney, Agent, or Firm—Price, Gess & Ubell

[57] ABSTRACT

Hand-held photographic light meters which may be of either the incident light or the spot variety are equipped with means of transmitting the light intensity measured to a suitably equipped automatic camera by means of a modulated beam of infra-red radiation. In this way the camera is set accurately regardless of the reflectance of the subject. Continuous or flash or a mixture of the two lights may be used. The camera has to be modified to receive the infra-red radiation in Type A of the invention while in Type B a special receiving unit which mounts on the hot-shoe is used to give a less flexible performance. More than one camera may be set simultaneously and most of the features of the automatic camera are retained.

1 Claim, 3 Drawing Figures

AUTOMATIC HAND-HELD PHOTOGRAPHIC LIGHT METERS

This is a continuation of application Ser. No. 639,664, filed Aug. 8, 1984 now abandoned.

BACKGROUND OF THE INVENTION

1. Field of the Invention

This invention relates to photographic light meters which are held in the hand and are of the type known as incident light or spot meters.

2. Description of the Prior Art

Although there have been many developments in the electronic control of the exposure setting of photographic cameras, the light metering employed has always been of the reflected light variety. In this, the camera is set on the assumption that the subject being illuminated and to be photographed has average reflectance of 18%. If the subject does not have that average reflectance, the camera meter is "fooled" (to use the widely accepted jargon) and the user has to compensate using a combination of experience and guesswork. Incident light metering, as its name implies, measures the light falling on the subject and is not liable to the introduction of errors due to non-average reflectance. In spot metering, a very small part of the subject area is selected by the user to act as typical of the whole scene and the light reflected by that small area is measured and the value is used to set the camera. Until now, however, the camera has always had to be set manually after the readings of the incident light or spot meter have been obtained.

SUMMARY OF THE INVENTION

In the present invention, a new type of hand-held meter is described wherein the essential feature is that the results of the measurement of light are not displayed on the meter but are conveyed to the camera as modulations of a beam of infra-red radiation. The camera is equipped with means of demodulating the beam of radiation and transferring the information thus imparted to the microcomputer already contained within the camera for the purpose of electronic control of its shutter and aperture. The invention is thus usable only with cameras having some part of their mechanism controlled electronically.

The means of demodulating the beam of infra-red radiation may either be contained within the camera itself or within a separate "receiver" box which mounts on the hot-shoe of the camera and controls the camera through the contacts already provided. Depending upon the method employed to receive the beam of infra-red radiation the invention takes two different forms: if the reception takes place within the camera itself, which therefore will be a modified instrument and not a standard one already obtainable, the invention will be referred to herein as Type A. If a separate receiver box which can be attached to an already obtainable camera is used to receive the infra-red radiation, the invention will be referred to as Type B.

The differences between the various versions of the invention are of detail and the embodiment of the invention will now be described by way of example considering an incident light meter operating with a camera which has been modified to receive the infra-red signals; i.e. an incident light Type A meter.

DETAILED DESCRIPTION OF THE PREFERRED EMBODIMENTS

Figure 1:
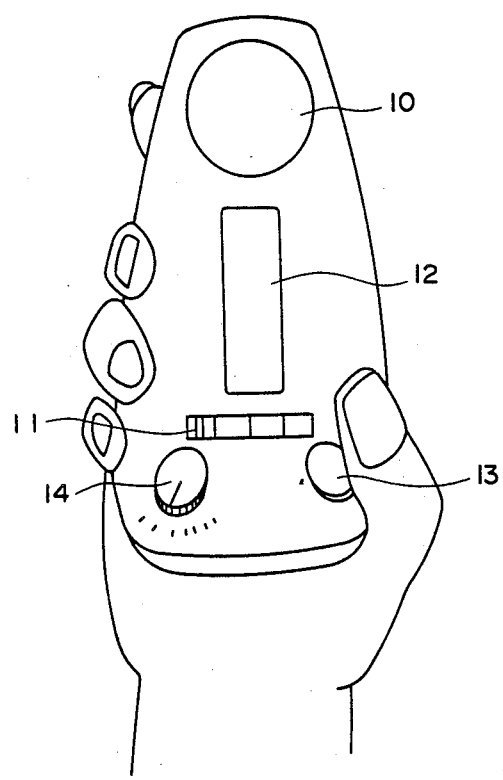
FIG. 1 illustrates the external appearance of the handheld automatic incident light meter.

Referring to FIG. 1, the light incident upon the meter falls upon a translucent hemisphere 10 which is identical to those used in earlier types of incident light meters. The switch 11 has four positions: in the first, the unit is switched off, in the second the internal circuitry is arranged for the measurement of continuous light such as daylight or tungsten lights as used in a studio, in the third the internal circuitry is arranged for the measurement of flash light, in the fourth the internal circuitry is arranged for the measurement of a mixture of continuous light and of flash light. The window 12 permits the emission of infra-red radiation from the infra-red emitting diodes placed behind it. The button 13 is operated to initiate the entire measurement and transmission sequence. The knob 14 is used only when switch 11 is in its fourth position and is used to select the time interval over which the measurement of the mixture of continuous and flash light is to take place.

Figure 2:
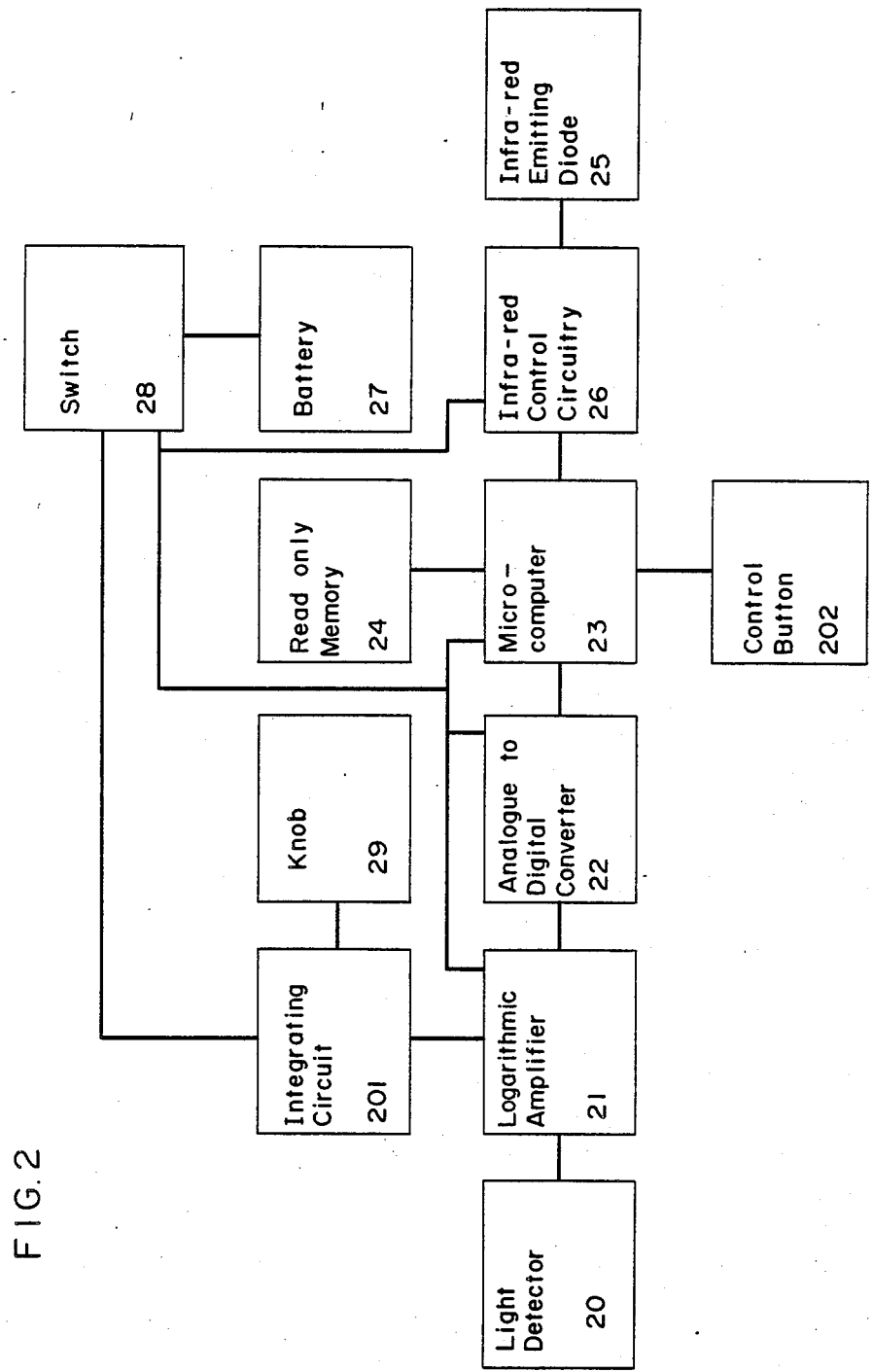
FIG. 2 indicates schematically the arrangement of the essential components within the meter.

Referring to FIG. 2 which shows only the essential features of the circuitry in a schematic form for clarity, the measuring photo-electric device 20 is connected to an amplifier 21 whose output is proportional to the logarithm of its input. Thus the incident light value is represented at the output of 21 in the logarithmic form universally used in photographic photometry. The range of light values required for a useful photographic light meter extends over 22 to 24 stops and for precise setting of the camera, this range is covered in 1/10th stop intervals in the present invention. Thus there are about 220 to 240 different light values to be handled by the apparatus. This number is easily handled by 8 binary digits ("bits") and the analogue to digital converter 22 is therefore an 8 bit device. There is plenty of time for all the signal processing needed to be done and the microcomputer 23 is an expensive 4 bit device. The read only memory (ROM) 24 contains the operating programme for the device and also holds the necessary control codes which are transmitted to the camera to initiate the correct operations in its microcomputer. The infra-red emitting diode 25 is connected to the control circuitry 26 which is a standard commercially available device (for example the Plesscy SL490), but could, for convenience, be a specially built unit without affecting the basic principles of the invention. The control circuitry 26 uses a 5 bit pulse position modulation of the emitted infra-red radiation from the diode 25 which enables the use of check bits for every 4 bit word initiated by the microcomputer 23 for transmission to the camera. The measured light value is produced by the analogue to digital converter 22 in the form of an 8 bit word which is converted to two 4 bit words by the microcomputer 23 before transmission. The whole circuitry is powered by the battery 27. Switch 28 is the same as switch 11 of FIG. 1. Knob 29 is the same as knob 14 of FIG. 1. The integrating circuitry 201 is used only when switch 28 is in its fourth position and the light value measured is that relating to the combination of continuous and flash light. Control button 202 is the same as button 13 of FIG. 1.

Figure 3:
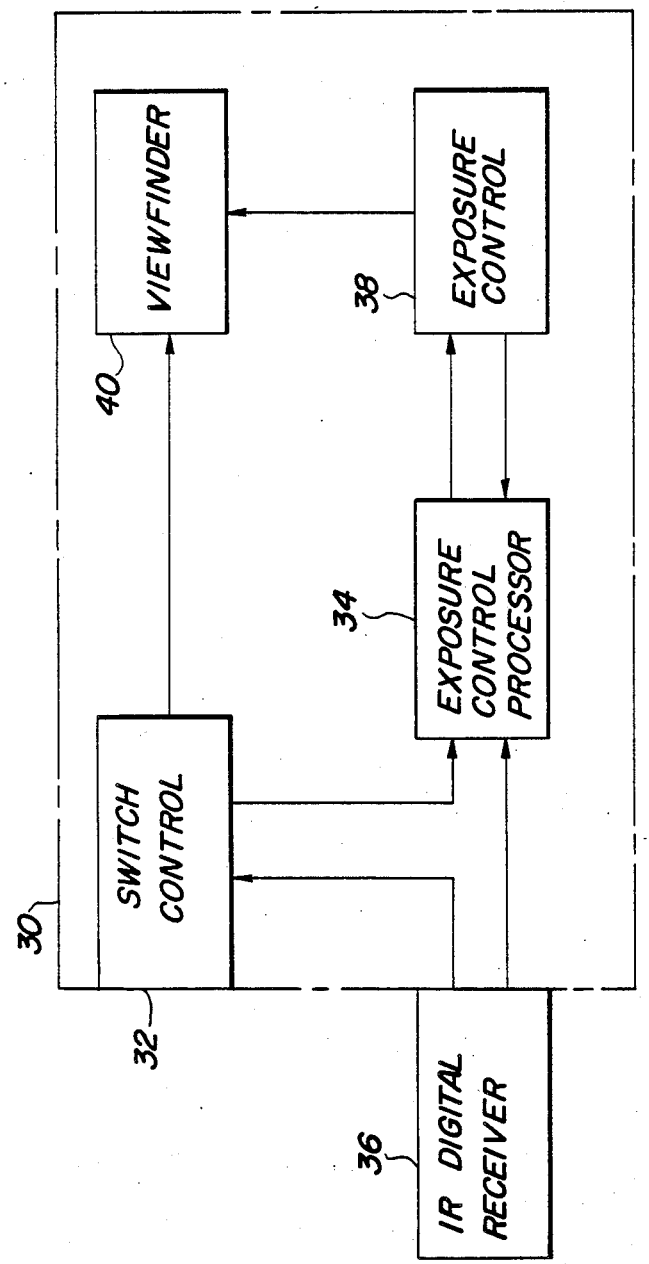
FIG. 3 indicates schematically the component parts of the present invention in the form of a camera.

The modifications required of the camera to be used with the invention such as shown in FIG. 3 depend in particular details on the precise model of camera under consideration; for the present purposes, therefore, the modifications will be described in general terms. The following are the modifications required: (a) a switch 32 to change over from the normal, internal light metering already provided by the camera manufacturer; this switch will perform in addition the following functions; (a1) set the memory-hold facility on the camera microcomputer 34, (a2) implement a special signal in the camera viewfinder 40, (a3) connect the infra-red receiving circuitry 36 to the camera battery and to the camera microcomputer.

(b) an infra-red receiving device together with the associated signal conditioning circuitry. It should be noted that the signals to be received are all in digital form and will therefore be in a form suitable for direct use by the camera microcomputer.

(c) some changes have to be made to the software associated with the operation of the camera microcomputer to permit it to handle the signals being received from the hand-held light meter.

The precise form of the codes to be sent over the infra-red communication channel from the hand-held light meter to the camera 30 depend upon the particular model of camera which is to be used with the invention and cannot, therefore, be described in exact detail. However the essential features can be set out in sufficient detail to make clear the novel features of this invention.

The codes to be sent are different for each setting of switch 11 in FIG. 1 and the three different modes of operation will be described in turn.

Setting for continuous light. The special switch 32 that is required on the camera is switched to the "external" metering position; as mentioned above, this has set the memory hold facility in the camera 30, set a display in the viewfinder 40 warning the user that external operation has been selected but that no light value has been received, and has also connected the infra-red receiving equipment. The hand-held meter is held so that the measuring translucent hemisphere (10 in FIG. 1) and the infra-red transmission window (12 in FIG. 1) are pointing towards the camera. The button (13 in FIG. 1) is pressed. The following stream of signals is then sent to the camera 30 by the invention.

(i) signal to prepare the receiving circuitry 36 (this is known in data transmission as the "wake-up" signal)

(ii) signal to indicate to camera that continuous light measurement follows (iii) signal to release the memory hold facility so that it is ready to receive the light value (iv) signal comprising two 4 bit words indicating the light value as measured by the hand-held light meter (v) signal to reset the memory hold facility so that the light value transmitted is retained in the memory circuits of the camera 30

(vi) signal to change the display in the viewfinder from the warning signal to one which indicates that an external light reading has been received, and is ready for processing by the camera microcomputer 34. This signal will also release the shutter lock and allow photographs to be taken (vii) signal to shut down the receiving circuitry (this is known as the "putting to sleep" signal in data transmission).

The camera 30 can now be used in its normal way and settings may be made of film speed, shutter speed or aperture in the ordinary manner of use as identified by the exposure control 38 in FIG. 3; the camera microcomputer 34 being used to ensure that all settings combine to produce an exposure suitable for the light value as measured by the hand-held meter which is the subject of this invention. Since, in this example, the light reading corresponds to an incident light reading, the exposure of the camera 30 will not be subject to errors if the subject matter of the photograph does not have the average reflectance of 18%.

Setting for flash light. The initial settings as the same as those described previously for the camera and will not be repeated. When the control button (13 in FIG. 1) is pressed, the following stream of signals is sent to the camera by the invention.

(i) signal to prepare the receiving circuitry (ii) signal to indicate flash light measurement follows; this signal will also disable the shutter speed dial on the camera (iii) signal to set shutter speed on the camera to the so-called synchronizing speed (iv) signal to release the memory hold facility (v) signal to fire the flash Note that the flash gun unit or units is connected to the camera in the normal way and the camera circuitry has been modified to permit the firing of the flash unit or units on receipt of the appropriate signal from the invention (vi) signal comprising two 4 bit words indicating the light value as measured by the hand-held light meter (vii) signal to reset the memory hold facility so that the light value transmitted is retained in the memory circuits of the camera (viii) signal to change the display in the viewfinder from the warning signal to one which indicates that an external flash light reading has been received and that it is ready for processing by the camera microcomputer. This signal will also release the shutter lock and allow photographs to be taken (ix) signal to shut down the receiving circuitry.

The camera now has the possibility of having the film speed setting changed and the camera microcomputer will automatically adjust the aperture setting to suit the light value as measured by the hand-held light meter which is the subject of this invention. As in the continuous light example mentioned before, the light value measured is not subject to errors by the subject matter not having the average reflectance, and, in addition, the light from any number of flash light units is automatically measured correctly.

Setting for a mixture of continuous light and of flash light. This setting is very similar to the setting for flash light alone and only the changes from the mode of operation described for flash light will be described.

Instead of setting the shutter speed to the synchronising speed (as described in "setting for flash light (iii)"), the shutter speed is set to that chosen on knob 14 of FIG. 1, which will, of course, be slower than the synchronising speed.

The light value transmitted to the camera ("setting for flash light (vi)") corresponds to the integral of the light falling on the measurement translucent hemisphere 10 of FIG. 1 during the period of time selected by the knob 14 of FIG. 1. Otherwise the features of this mode of operation are similar to those already described.

The spot light meter version of this invention is broadly similar to the one described except that the translucent hemisphere is replaced by an optical system of lenses permitting the light from only a 1° "window" of the subject to be photographed to fall on the photoelectric device 20 of FIG. 2 and also permitting the user to view the scene so that the 1° window may be carefully selected. A rotatable mount is provided to permit the infra-red transmission window 12 of FIG. 1 to be pointed towards the camera. Flash light and mixed continuous and flash light settings are not provided normally.

Version B of this invention differs from Type A in that the infra-red communication channel is terminated by a special receiver box rather than in the camera itself. The receiver box mounts on the hot shoe fitting of the camera and controls it in a manner analogous to a so-called "dedicated" flash gun. Since many of the features of the microcomputer built in to the camera cannot be used in Type B, it follows that Type A is a more flexible and convenient form of the invention. Type B is mentioned to indicate that it is not essential to have specially modified cameras for use with the invention.

With all versions of the invention it is possible to use the hand-light meter to set more than one camera at a time. It is not necessary that they all be fitted with the same sort of film or that they be set to the same shutter speed, for example. The essence of the invention is that the light value measured is transmitted to the camera in a form which allows the microcomputer within the camera (or within the Type B circuitry) to arrive at the final exposure settings. Thus, for example, a complicated photograph could be recorded using several cameras arranged to cover a range of films and a range of "bracketing" exposures—all the cameras can be set with one operation of one hand-held meter as described in this invention provided only that they are in the beam of the emitted infra-red radiation.

It is anticipated that commercial exigencies may dictate that sub-versions of the invention be produced. For example a Type A for incident light metering for continuous light only. It is held that these are all manifestations of the same basic invention.

The time taken to transfer all the necessary information from the invention to the camera depends on the nature of the measurement (continuous light or flash) and on the actual codes to be sent since the coding employed is pulse position modulation. An approximate time for the transmission of a flash light measurement is 500 to 600 ms.

This time is short enough to allow the use of error detecting and error correcting codes in the transmission without operator inconvenience and the transmission of information will be very reliable.

What I claim is:

1. In a light exposure control system including a camera for photographing a subject, a remote light measuring device and an infrared receiver connected to the camera, said light measuring device comprising:
    a light receiving means for receiving light incident at the location of the subject to be photographed and generating a plurality of light quantity signals each signal being representative of a different measurement of said light;
    a light emitting means for emitting infrared light;
    means including an analogue to digital converter for converting each light quantity signal generated by said light receiving means into an eight bit digital signal representative of the particular light quantity signal; and
    means including a microcomputer for driving said light emitting means to emit modulated infrared light in a series of four bit words carrying data corresponding to said digital signal;
    said receiver comprising:
        means for receiving the infrared light; and
        means for reading the series of four bit word data carried by said infrared light to provide a digital output,
    said camera comprising:
        means for controlling exposure in accordance with the digital read data including an exposure control processor and a switch control to enable the control processor to receive said digital output from the receiver.

* * * * *